March 22, 1949.                    J. R. M. TISDALE                    2,464,903
                        SPRING ROLLER FOR WINDOW SCREENS,
                               BLINDS, AND THE LIKE
                                Filed Feb. 21, 1947
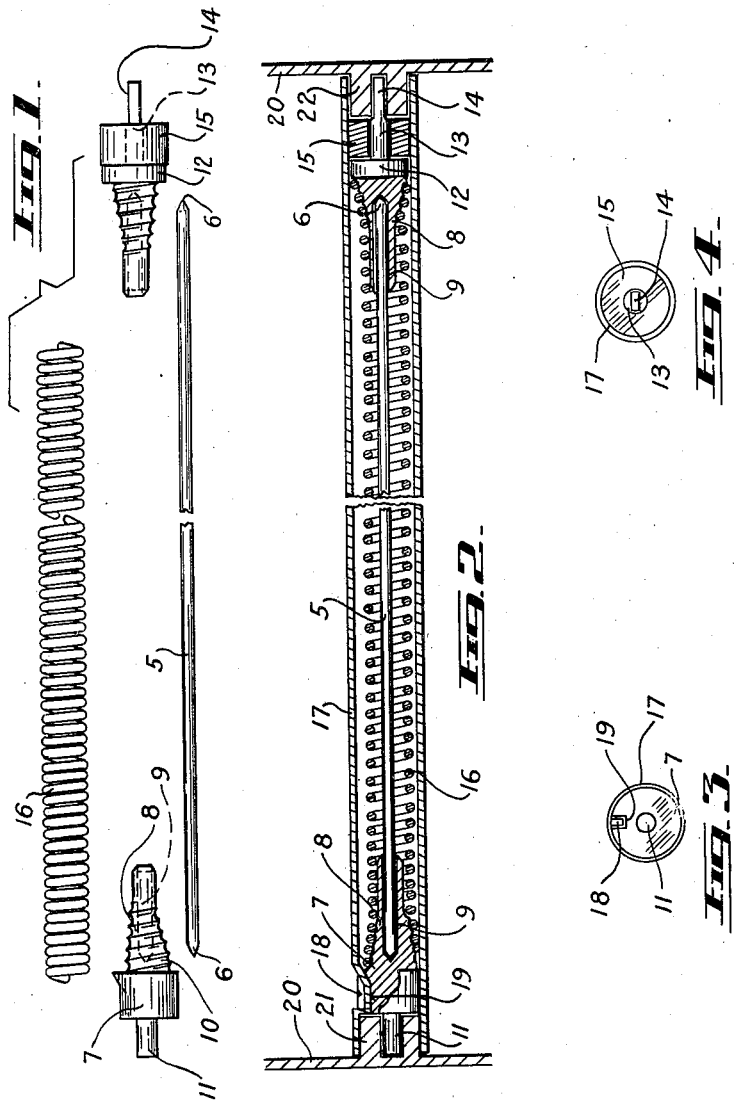
Inventor
JAMES R.M. TISDALE.
by  W. Irwin Haskett.
                    Attorney.

Patented Mar. 22, 1949

2,464,903

UNITED STATES PATENT OFFICE 2,464,903

SPRING ROLLER FOR WINDOW SCREENS, BLINDS, AND THE LIKE

James R. M. Tisdale, Beaverton, Ontario, Canada, assignor of one-half to Donald J. Smith, Beaverton, Ontario, Canada Application February 21, 1947, Serial No. 729,919
In Canada September 10, 1941

3 Claims. (Cl. 160—325)

This invention relates to improvements in a spring roller for window screens, blinds and the like and appertains particularly to a novel structure of more substantial design and wherein the relative efficiency of the winding mechanism is increased.

An object of the invention is to provide a spring roller adapted to be supported at its ends and comprising an outer tubular body within which a coil spring operated spindle mechanism is housed, the turning of the tubular body acting to wind the spring as one end thereof is designed to be held against rotation.

A further object of the invention is to provide a spring roller having a spindle mechanism comprising an axial spindle with taper-pointed ends, a pair of spools that serve as end bearings mounted on opposite ends thereof and a coil spring wound about said spindle and stretched so that its ends engage the opposite spools and hold the assembly together.

A further object of the invention is to provide the confronting inner ends of these bearing spools with tapered threads onto which the ends of the stretch coil spring, once started, will wind and tighten, securely holding the mechanism against accidental disassembly and enabling the wound spring to impart the fullest strength of its winding on the roller with the minimum of friction loss.

A further object of the invention is to provide a spring roller having simplified means for connecting the rotatable spool and tubular body and possessing improved ends for the accommodation of the supporting bearings.

A still further object of the invention is the provision of a spring roller of the nature and for the purpose described that is characterized by structural simplicity, substantial and rugged design, ease of assembly and installation and being capable of manufacture at a reasonable cost is thereby rendered commercially desirable.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:

Figure 1 is an elevation of the spindle mechanism about to be assembled;

Figure 2 is a longitudinal section of the assembled roller; and

Figures 3 and 4 are elevations of the opposite ends of the roller showing respectively the rotatable and fixed spools.

This spring roller is an improvement on the one disclosed in a previously abandoned application #307,479, filed December 4, 1939, and like that one is primarily designed to carry a copper, bronze or other metallic wire screen and on that account the structure though simple is stronger and more substantial than is usually found in conventional spring rollers. Because of the greater load in winding a metallic screen, the spring is stretched in its initial mounting so as to get the full benefit of its winding and, to reduce the friction loss to the minimum, the spindle is journalled in pin-point bearings at both ends obtaining thereby what is called a full floating support.

The spindle 5 is in the form of a rod tapered to a so-called pin-point at both ends 6, at approximately 30°. A floating, self-centering spool 7 has a tapered extension 8 on one end with an axial bore 9 of substantially greater diameter than said spindle, extending in almost to the main body, with a bevelled inner end at substantially more than 30° for the reception of the end of the spindle 5. The tapered extension 8 has an exterior thread 10 for a purpose to be presently explained. An axial trunnion 11 extends from the other side of the main body of the spool. On the other end of the spindle is mounted a similar spool 12, differing from the spool 7 only in having a narrower body and a longer trunnion 13, the outer half of which is flattened on opposite sides as at 14 so that the same may be held against rotation. A roller 15, preferably just exceeding the diameter of the body of the spool 12, is free to rotate on the inner end of the trunnion against the body of the spool.

A substantial coil spring 16 surrounds the spindle 5. Its interior diameter is less than the larger end of the threaded tapered extension 8 on the spools but the pitch is substantially the same and it is on these threaded tapered extensions of the spindle spaced spools 7 and 12 that the opposite ends of the coil spring 16 attach. The coil spring in normal or retracted form is short of the necessary length to reach from spool to spool by approximately five to ten percent or roughly one inch to the foot (approximately eight percent) so that after threading onto one tapered spool it must be stretched to engage the threaded taper at the far end which is screwed into the coil until secure. It is found in practice that though the tapered spools screw easily into the ends of the coil they are difficult to retract so that once they are caused to grip the coil they tend to tighten with use. This stretching of the spring to extend from spool to spool, besides holding the spindle mechanism in assembly, serves to spread the convolutions of the coil so that as the spring is wound and the number of the convolutions increases, the tension of the spring mounts without distortion or crowding of the convolutions.

Encasing this spindle assembly is a tubular body or sleeve 17 whose interior diameter is such that it just slides freely over the spools 7 and 12 and roller 15 and of a length to extend to the outer ends of the trunnions 11 and 13. Means is provided to prevent the relative rotation of the sleeve and the spool 7 for instance a detent in the form of a depressed spring finger 18 in the sleeve and an accommodating longitudinally extending groove or indentation 19, on the body of the spool, which inclines outwardly at its inner end.

The spring roller is held between suitable supporting brackets at opposite ends which in the embodiment here illustrated are moved longitudinally into engagement. These brackets are made integral with or mounted on a supporting surface, that may represent the removable ends 20 of a housing or jacket, and are formed as horizontal tubular or female bearings 21 and 22 that receive respectively the trunnions 11 and 13 the former being rotatable in its bearing and the latter held against rotation by the latter bracket bearing 22 being correspondingly flattened interiorly. These female supporting bearings 21 and 22 besides receiving the respective male trunnions 11 and 13 are themselves accommodated within the ends of the outer roller or sleeve 17 so that a screen, blind or the like winding thereon may be of a width substantially equal to the length of the roller.

Though not a part of the instant invention, the wire screen, not shown, is attached to this sleeve 17 by having a finishing strip applied across its end which strip is in turn connected to the sleeve as for instance by spot welding at suitably spaced points.

In use it will be seen that a screen wound about the roller, in being withdrawn will rotate the roller 17 and its attached spool 7, causing the spring 16 to wind due to its far end being held against rotation by the spool 12 whose squared trunnion 13 is securely anchored. This end of the tube 17 is adequately supported, however, by the freely rotatable bearing roller 15 and this screen carrying tube is allowed to wind and unwind with the minimum of resistance because of the almost frictionless mounting afforded the spindle 5 by the pin-point bearings provided it at both ends. Thus the coil spring, stretched between the spools, and self tightening thereon, is instantly responsive to any winding action and because of the floating nature of its supporting mechanism with its low frictional loss is enabled to exert its maximum winding force.

From the foregoing description taken in connection with the accompanying drawings, it will be manifest that a spring roller for window screens, blinds and the like is provided that will fulfil all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings shall be interpreted as illustrative and not in a limitative or restrictive sense.

Having thus described the invention, what is claimed as new is:

1. For a spring roller having a spindle assembly comprising a spindle, and coil spring connected spools rotatably mounted on the opposite ends thereof, trunnions on the outer ends of said spools, a sleeve bearing on one of said trunnions of a diameter just greater than that of the spool and a tubular roller surrounding said spindle, spools and spring, turning on said sleeve bearing and fastened against rotation to the other spool.

2. A spring roller for screens, blinds and the like comprising a spindle, a spool mounted on each end of said spindle, said spools each having a tapered extension on its inner end, with an axial spindle accommodating bore therein, one of said spools having a round trunnion on its opposite end and the other spool having a trunnion that is flattened on opposite sides, a stretched coil spring surrounding said spindle and secured at opposite ends on the tapered extensions of said spools, a tubular roller surrounding said spindle, spools and spring, a spring finger detent formed in said roller spaced in from an end thereof and an accommodating elongated inclined groove, cut in said spool having the round trunnion, whereby the relative rotation of said roller and spool is prevented while allowing the longitudinal withdrawal of the spool to be forced.

3. In a spring roller mechanism, the method of assembly which consists in mounting floating, self-centering, exteriorly threaded spools on opposite end of a pin-point spindle about which a coil spring is wound, stretching said spring to engage said spools, screwing said threaded spools securely into the ends of said coil to axially align said spools and secure them on said spindle, inserting within a roller and then distorting said roller by pressing a punched-out finger therein to engage a groove in one of said spools to hold the same against rotation relative thereto.

JAMES R. M. TISDALE.

No references cited.